US011328295B1

United States Patent
Xu et al.

(10) Patent No.: US 11,328,295 B1
(45) Date of Patent: May 10, 2022

(54) SECURE MESSAGING-BASED DELAYED PAYOUT MEDIATION WITH PROTECTIVE COUNTERMEASURES

(71) Applicant: Meta Platforms, Inc., Menlo Park, CA (US)

(72) Inventors: Jasmine Ni Xu, San Jose, CA (US); Thilak Thenpandyian, Union City, CA (US); Ming-Li Kathy Koh, Singapore (SG); Tianyu Tang, Singapore (SG); Justin Edgar Berot-Burns, San Francisco, CA (US); Kaneeka Arora Agarwal, Menlo Park, CA (US); Charles Li, Mountain View, CA (US); Julie Wenyen Jen, San Jose, CA (US); Zixi Li, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/227,239

(22) Filed: Apr. 9, 2021

(51) Int. Cl.
*G06Q 20/38* (2012.01)
*G06Q 20/40* (2012.01)
(Continued)

(52) U.S. Cl.
CPC .......... *G06Q 20/386* (2020.05); *G06Q 20/02* (2013.01); *G06Q 20/389* (2013.01); *G06Q 20/407* (2013.01); *H04L 63/0428* (2013.01)

(58) Field of Classification Search
CPC .... G06Q 20/386; G06Q 20/02; G06Q 20/389; G06Q 20/407
(Continued)

(56) References Cited

U.S. PATENT DOCUMENTS

2016/0117651 A1* 4/2016 Davis ................. G06Q 20/3255
705/40
2016/0117665 A1* 4/2016 Davis .................. G06Q 20/223
705/39

(Continued)

OTHER PUBLICATIONS

"ULink: Enabling User-Defined Deep Linking to App Content," by Tanzirul Azim; Ohana Riva and Suman Nath. MobiSys '16: Proceedings of the 14th Annual International Conference on Mobile Systems, Applications and Services. Jun. 2016. pp. 305-318. (Year: 2016).*

*Primary Examiner* — Sara C Hamilton
(74) *Attorney, Agent, or Firm* — Fenwick & West LLP (57) ABSTRACT

An online system receives information about a first transaction including a destination account identifier and a payment amount from a source computing device. The online system sends the source computing device a deep link to a second application. The online system receives a confirmation including a transaction identifier from the second application. The payment was sent to an intermediate payment processor, which records the first transaction in a ledger in association with a source account identifier. The online system receives an instruction to reverse the first transaction. The online system sends an instruction to generate a second transaction to a source account of the source computing device including the transaction identifier and not the source account identifier to the intermediate payment processor. The online system receives a confirmation of the second transaction, where the intermediate payment processor queried the ledger using the transaction identifier to identify the source account.

20 Claims, 4 Drawing Sheets

(51) Int. Cl.
  *G06Q 20/02* (2012.01)
  *H04L 29/06* (2006.01)
(58) Field of Classification Search
  USPC .......................................................... 705/44
  See application file for complete search history.

(56) References Cited

U.S. PATENT DOCUMENTS

| | | | |
|---|---|---|---|
| 2016/0117666 A1* | 4/2016 | Davis | G06Q 20/384 |
| | | | 705/39 |
| 2016/0117670 A1* | 4/2016 | Davis | G06Q 20/386 |
| | | | 705/39 |
| 2016/0224967 A1* | 8/2016 | Davis | G06Q 20/26 |
| 2018/0315051 A1* | 11/2018 | Hurley | G06Q 20/384 |
| 2019/0019171 A1* | 1/2019 | Silvestre | G06Q 20/405 |
| 2019/0230070 A1* | 7/2019 | Isaacson | H04W 12/084 |
| 2019/0295052 A1* | 9/2019 | Muthu | G06Q 20/385 |
| 2019/0306137 A1* | 10/2019 | Isaacson | G06Q 20/12 |
| 2020/0382480 A1* | 12/2020 | Isaacson | G06Q 20/203 |

* cited by examiner

Receive, by an online system, from a first application running on a source computing device, information about a first transaction comprising a destination account identifier and a payment amount, wherein the destination account identifier identifies a destination account to which a payment quantified by the payment amount is to be sent
710

Send, by the online system, to the source computing device, a deep link to a second application on the source computing device, the deep link comprising the information about the first transaction
720

Receive, by the online system, from the second application, a confirmation that the first transaction occurred comprising a transaction identifier for the first transaction, wherein the payment was sent to an intermediate account at an intermediate payment processor, and the intermediate payment processor records the first transaction in a ledger in association with the transaction identifier and a source account identifier identifying a source account from which the payment was made
730

Receive, by the online system, an instruction to reverse the first transaction
740

Send, by the online system, to the intermediate payment processor, an instruction to generate a second transaction from the intermediate account to the source account, wherein the instruction to generate the second transaction comprises the transaction identifier of the first transaction without the source account identifier
750

Receive, by the online system, a confirmation of the second transaction, wherein the intermediate payment processor queries the ledger using the transaction identifier of the first transaction to identify the source account identifier to which the second transaction directs the payment
760

FIG. 7

SECURE MESSAGING-BASED DELAYED PAYOUT MEDIATION WITH PROTECTIVE COUNTERMEASURES

BACKGROUND

This disclosure relates generally to securing online systems and in particular to protecting user information in an online messaging environment.

Users of online systems, such as social networks, often communicate with one another using messaging applications provided by the online systems. Unstructured sales are popular, especially in emerging markets, which may use messaging applications to conduct the unstructured sales. One user may offer a product for sale using the online system, and another user contacts the selling user about buying the product using the messaging application.

Users often do not trust messaging applications or other third parties in a network with financial information out of fear of fraud, theft, or the like. In particular, users may not want to share their banking information, such as bank account numbers, with such parties. However, users typically do trust their own banking applications with financial information, since the banking applications are administered by the banks, which already have access to the users' banking information.

SUMMARY

In various embodiments of the invention, users of a messaging application communicate with one another regarding a first transaction to exchange a good or service for payment. A user, via a source computing device, sends information about the first transaction to an online system. The online system receives the information about the first transaction, which includes a payment amount and a destination account identifier that specifies the account to which the payment is to be made.

The online system then sends the source computing device a deep link to a second application connected to a source account of the user. The user uses the second application to initiate a transaction, not to the destination account, but to an intermediate account managed by the online system at an intermediate payment processor. The intermediate payment processor records the first transaction in a ledger in association with a source account identifier specifying the source account from which the payment was taken. The online system cannot access the source account identifier. The online system receives a confirmation including a transaction identifier from the second application.

At some later time, the online system receives an instruction to reverse the first transaction. The online system sends an instruction to the intermediate payment processor to generate a second transaction to the source account. The instruction includes the transaction identifier and not the source account identifier, as the online system does not have access to the source account identifier. The intermediate payment processor conducts the second transaction by querying the ledger using the transaction identifier to determine the source account, to which the second transaction directs the payment from the intermediate account. The online system receives a confirmation of the second transaction from the intermediate payment processor upon completion of the second transaction.

In this manner, an online system can provide delayed payout functionality to users engaging in a transaction, without exposing the online system or the seller to the buyer's account information. This provides increased security to the buyer, both in terms of securing the buyer's source account and also avoiding fraud by enabling the buyer to reverse a transaction after it has been conducted.

BRIEF DESCRIPTION OF THE DRAWINGS

FIG. 7 is a flowchart illustrating a process for reversing a delayed transaction, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
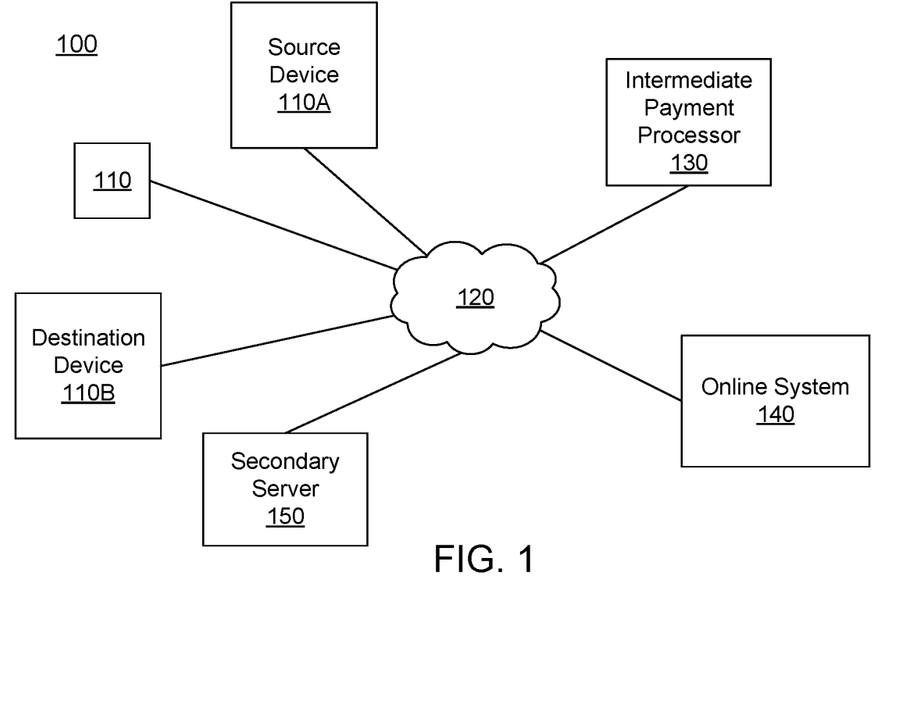
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110 including source device 110A and destination device 110B, a network 120, an intermediate payment processor 130, the online system 140, and one or more secondary servers 150. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The source device 110A is a client device 110 that includes a first application 310 and a second application 320, and is described in greater detail below with reference to FIG. 3. The source device 110A is the client device 110 of a buyer in a transaction, who exchanges money for a product or service. The destination device 110B is a client device 110 that includes the first application 310. The destination device 110B is the client device 110 of a seller in a transaction, who exchanges a product or service for money.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The intermediate payment processor 130 is a bank computing system separate from but associated with the online system 140. The intermediate payment processor 130 performs actions responsive to instructions from the online system 140. The intermediate payment processor 130 retains data separate from the online system 140. The intermediate payment processor 130 is described in greater detail below with reference to FIG. 5.

The online system 140 is a computing system that communicates with the client devices 110. In an embodiment, the online system 140 is an application provider communicating information describing applications for execution by a client device 110 or communicating data to client devices 110 for use by one or more applications executing on the client device 110. In other embodiments, the online system 140 provides content or other information for presentation via a client device 110. The online system 140 is described in greater detail below with reference to FIG. 2.

The secondary server 150 is a bank computing system separate from and not associated with the online system 140. For example, the secondary server 150 is a bank server of a bank serving a user of the source device 110A and/or destination device 110B. Depending upon the embodiment, there may be multiple secondary servers 150. For example, a user of the source device 110A may have a bank account provided by a first secondary server 150 and a user of the destination device 110B may have a bank account provided by a second secondary server 150. The secondary server 150 is described in greater detail below with reference to FIG. 4.

Figure 2:
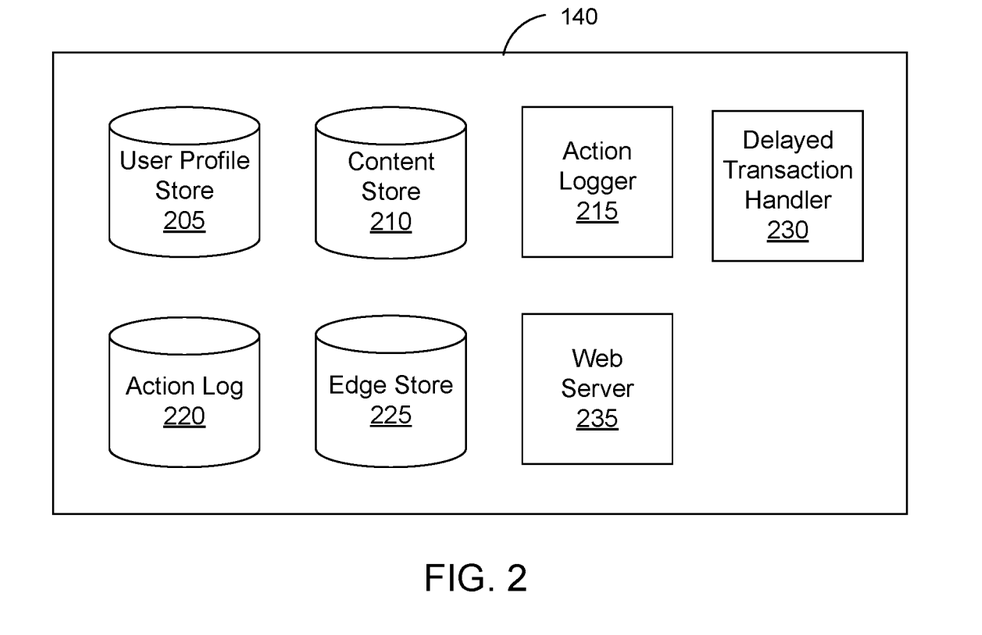
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a web server 230, and a delayed transaction handler 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

A user profile may store user associations with applications running on the user's client device 110, such as a messaging application. Users may use the messaging applications to communicate with one another, such as to come to terms for a transaction. As a specific example, a buyer and a seller may agree on a payment amount in exchange for a good or service via a message thread accessed using respective messaging applications on respective client devices 110. A user profile may store information related to the messaging application, such as identifiers for the user profiles of other users whom the user has messaged in the past.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. A user profile of an organization, such as a business, may be identified by the online system 140 as a high trust organization. Alternatively, a user profile of a user associated with an organization identified as a high trust organization may, by extension, be identified as a high trust organization. As described below, user profiles identified as high trust organizations may be provided streamlined transaction handling.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, e.g., using a messaging application, uploading an image, reading a message from another user, e.g., using a messaging application, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The delayed transaction handler 230 coordinates reversing delayed transactions among client devices 110 in association with the intermediate payment processor 130. The delayed transaction handler 230 sends and receives data among client devices 110, the secondary server 150, and the intermediate payment processor 130, and may store data related to delayed transactions. The delayed transaction handler 230 generates deep links using transaction information. A deep link is a uniform resource identifier that links to a specific location within a mobile application, such as the second application 320. The deep link also includes some or all of the transaction information used to generate the deep link. The delayed transaction handler 230 has access to and control over an intermediate account at the intermediate payment processor 130. As described in greater detail below, the intermediate account is a bank account, such as a checking account, used to temporarily store a payment during a delayed transaction.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
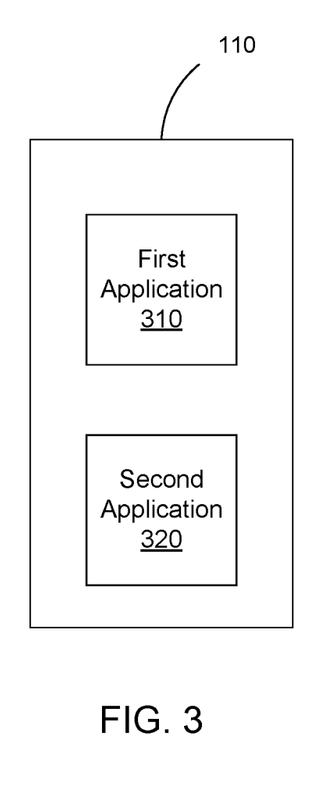
FIG. 3 is a block diagram of a client device, in accordance with an embodiment.

FIG. 3 is a block diagram of the client device 110, in accordance with an embodiment. The client device 110 includes the first application 310 and the second application 320. The first application may be a messaging application provided by the online system 140, as described above. A user of the client device 110 may use the first application 310 to negotiate and initiate transactions with other users using other instances of the first application 310 upon other client devices 110. The first application 310 can communicate with the online system 140, e.g., to send or receive information, such as instructions from a user to initiate a delayed transaction.

The second application 320 is associated with the secondary server 150 and can be used to initiate transactions. For example, the second application 320 may be a bank application provided by a bank with secondary server 150 that is a bank server. The bank application may be used to initiate transactions, such as transfers of funds, to or from user accounts held at the bank server. The bank application may also receive and distribute information related to transactions, such as account identifiers, transaction identifiers, and confirmations of transactions. Different client devices 110 may have different second applications 320. For example, the source device 110A may have a bank application of a first bank and the destination device 110B may have a bank application of a second bank.

Figure 4:
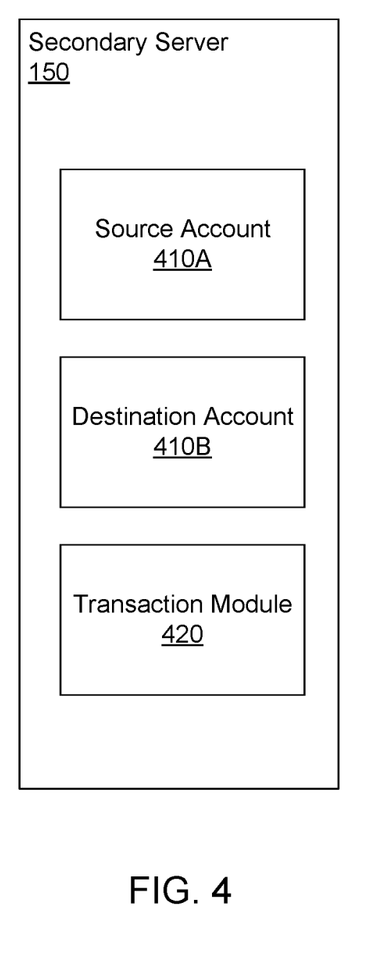
FIG. 4 is a block diagram of a secondary server, in accordance with an embodiment.

FIG. 4 is a block diagram of the secondary server 150, in accordance with an embodiment. The secondary server manages monetary accounts, such as the monetary accounts of users of client devices 110. The secondary server 150 includes a source account 410A, a destination account 410B, and a transaction module 420. In an embodiment, the secondary server 150 includes the source account 410A and not the destination account 410B, where the destination account 410B is at a different secondary server 150, e.g., a secondary server 150 of a different bank.

The source account 410A is a monetary account associated with a user of the source device 110A. The second application 310 upon the source device 110A can be used to manage the source account 410A. For example, the second application 310 upon the source device 110A can view information related to the source account 410A and initiate monetary exchanges to or from the source account 410A. The source account 410A has an identifier that distinguishes the source account 410A from other accounts.

The destination account 410B is a monetary account associated with a user of the destination device 110B. The second application 310 upon the destination device 110B can be used to manage the destination account 410B. For example, the second application 310 upon the destination device 110B can view information related to the destination account 410B and initiate monetary exchanges to or from the destination account 410B. The destination account 410B has an identifier that distinguishes the destination account 410B from other accounts.

The transaction module 420 processes monetary transfers involving one or more accounts managed by the secondary server 150. The transaction module 420 receives instructions to initiate transactions, such as monetary transfers, from second applications 320 and/or the online system 140 and subsequently conducts the transactions. The transaction module 420 generates and records transaction identifiers to differentiate transactions from one another. The transaction module 420 may send transaction identifiers and/or transaction confirmations to second applications 320 and/or the online system 140.

Figure 5:
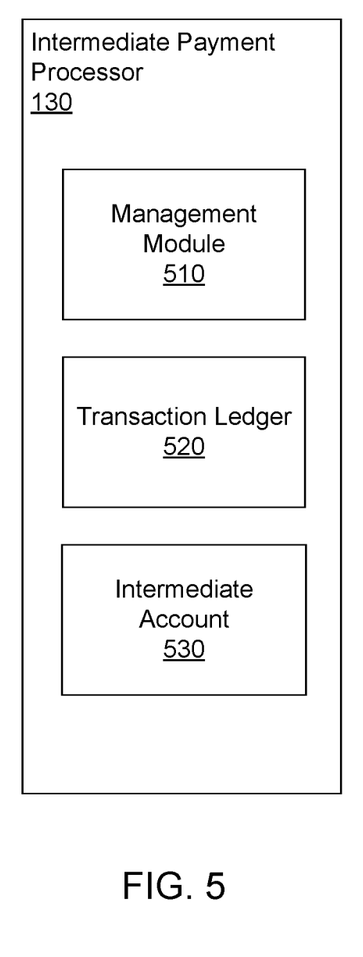
FIG. 5 is a block diagram of an intermediate payment processor, in accordance with an embodiment.

FIG. 5 is a block diagram of the intermediate payment processor 130, in accordance with an embodiment. The intermediate payment processor 130 includes a management module 510, a transaction ledger 520, and an intermediate account 530. The intermediate payment processor 130 manages monetary accounts and is associated with the online system 140.

The management module 510 processes monetary transfers involving one or more accounts managed by the intermediate payment processor 130. The management module 510 conducts transactions, such as monetary transfers, to and from accounts at the intermediate payment processor 130, such as the intermediate account 530. The management module 510 executes instructions received from the online system 140. One action the management module 510 performs responsive to receiving instructions from the online system 140 is initiating a new transaction using a transaction identifier of a past transaction. As described in greater detail below, the management module 510 identifies a destination for the new transaction by matching a transaction identifier to a record in the transaction ledger 520 and using the source identifier from the matched record as the destination identifier for the new transaction.

The transaction ledger 520 is a log of past transactions involving the intermediate payment processor 130. For each transaction, the management module 510 records information about the transaction in the transaction ledger 520. Depending upon the embodiment, data recorded in the transaction ledger 520 for a transaction can include a transaction identifier, a source identifier specifying an account from which money is moved, a destination identifier specifying an account to which money is moved, a quantity of money moved by the transaction, a date of the transaction, a time of the transaction, and an identifier for a client device 110 from which instructions were received to initiate the transaction.

The intermediate account 530 is a monetary account controlled by the online system 140. The online system 140 can initiate transactions to and from the intermediate account 530 by sending instructions to the management module 510. The intermediate account 530 has an identifier that distinguishes the intermediate account 530 from other accounts.

Delayed Transaction Processes

Figure 6:
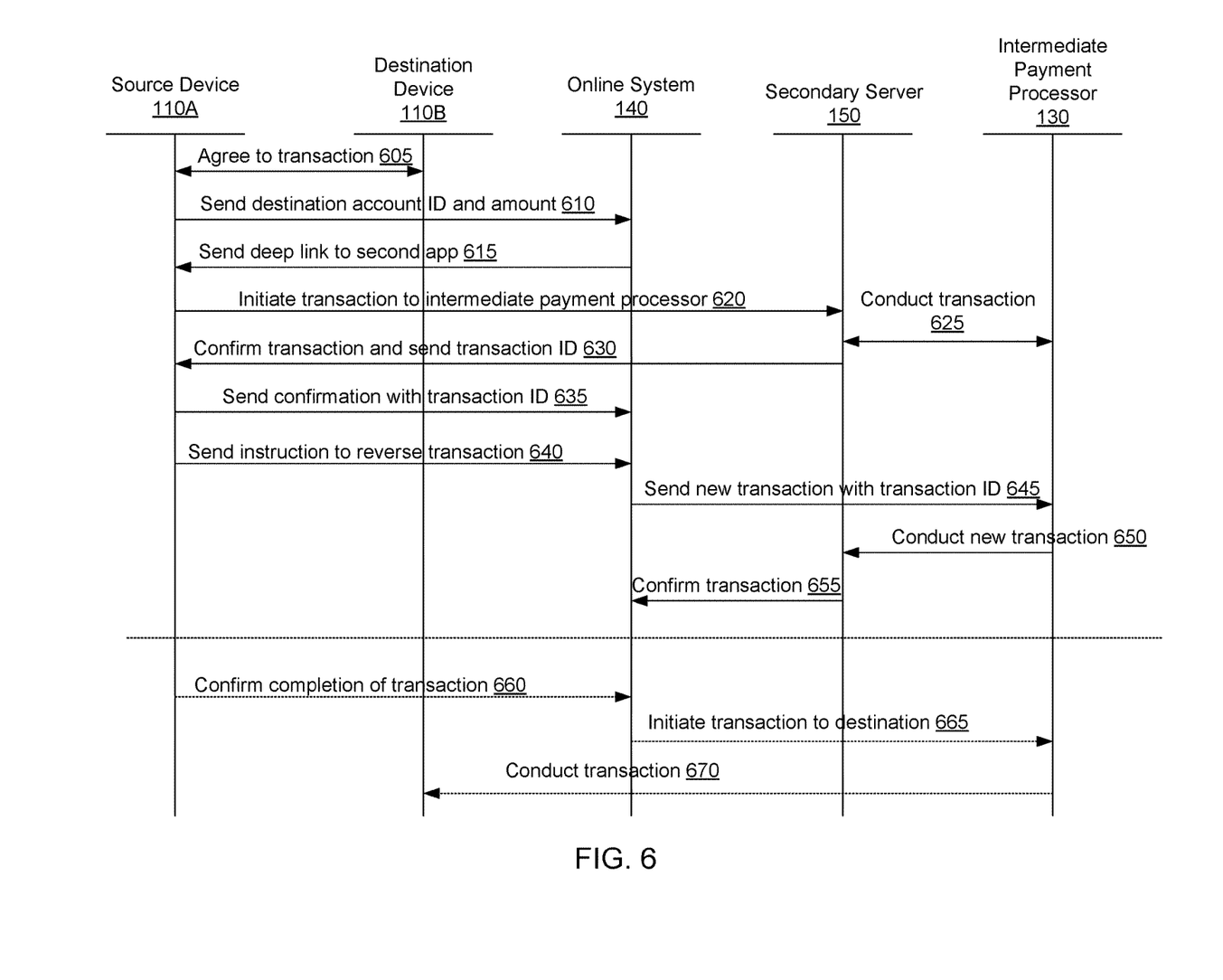
FIG. 6 is an event diagram illustrating a process for reversing a delayed transaction, in accordance with an embodiment.

FIG. 6 is an event diagram illustrating a process for reversing a delayed transaction, in accordance with an embodiment. Steps for reversing a delayed transaction are represented by solid arrows. Steps for proceeding with a delayed transaction are represented by dashed arrows and are not part of reversing a delayed transaction. As described in further detail below, when proceeding with a delayed transaction instead of reversing the delayed transaction, steps 640-655 are replaced with steps 660-670.

Users of the source device 110A and the destination device 110B reach agreement 605 on a transaction to exchange a payment for a good or service by communicating using respective first applications 310. The destination device 110B sends a destination account 410B identifier to the source device 110A using the first application 310. For example, the destination account 410B identifier may be a bank account number of the seller using the destination device 110B, to which the buyer using the source device 110A is to send the payment.

The source device 110A initiates the transaction by sending 610 the destination account 410B identifier, as well as the payment amount, to the online system 140. The source device 110A may initiate the transaction using the first application 310 to send the destination account 410B identifier and payment amount to the online system 140 as part of a message. The first application 310 may provide a widget with a connection to the delayed transaction handler 230 of the online system 140. Upon user interaction with the widget, the widget sends the destination account 410B identifier and payment amount to the online system 140. The widget may also send data related to a user profile of the buyer and/or seller, such as an identifier of the buyer's user profile and/or an identifier of the seller's user profile. The widget may also send data related to the source device 110A, such as an identifier of a second application 320 upon the source device 110A.

The online system 140 processes the information received from the source device 110A and generates a deep link to the second application 320 upon the source device 110A. The online system 140 redirects the payment from the destination account 410B to the intermediate account 530 for temporary holding during the delayed payout process. The deep link includes a path to the second application 320 upon the source device 110A and, depending upon the embodiment, may include various data related to the transaction, such as the intermediate account 530 identifier and the payment amount. The online system 140 sends 615 the deep link to the source device 110A.

The source device 110A receives the deep link, which launches the second application 320 upon the source device 110A. The second application 320 may prompt the user to log in or otherwise verify the user's identity. Upon accessing the second application 320, the source device 110A initiates 620 the transaction to transfer the payment from the source account 410A to the intermediate account 530. The second application 320 contacts the secondary server 150 and instructs the secondary server 150 to transfer the payment from the source account 410A to the intermediate account 530.

The secondary server 150 conducts 625 the transaction, transferring the payment from the source account 410A to the intermediate account 530. The secondary server 150 or intermediate payment processor generates a transaction identifier for the transaction. The intermediate payment processor 130 records the transaction at the transaction ledger 520 as well as the source account 410A identifier and the intermediate account 530 identifier. The intermediate payment processor 130 may also record additional information in the ledger 520 in association with the transaction identifier.

After completion of the transaction, the secondary server 150 sends a confirmation 630 of the transaction to the source device 110A. The confirmation includes the transaction identifier. The source device 110A sends the transaction identifier to the online system 140. Alternatively or additionally, the intermediate payment processor 130 sends the transaction identifier and/or confirmation to the online system 140. Alternatively or additionally, the online system 140 and/or source device 110A sends a notification to the destination device 110B that the payment was received.

The source device 110A sends 640 an instruction to the online system 140 to reverse the transaction. In an alternate embodiment, the destination device 110B sends 640 the instruction to the online system 140 to reverse the transaction. For example, if one of the buyer or seller decides to not proceed with the transaction, or if one of the buyer or seller discovers that the other is fraudulent. Depending upon the embodiment, the instruction to the online system 140 may include the transaction identifier and/or data of a user profile of one or both of the involved users. Using the received user profile data, the online system 140 identifies the relevant transaction and corresponding transaction identifier.

The online system 140 sends 645 instructions for a new transaction to the intermediate payment processor 130. Rather than identify the source account 410A identifier, which the online system 140 does not have and does not have access to look up, the online system 140 identifies the transaction in the instructions for the new transaction by the transaction identifier of the original transaction. The intermediate payment processor 130 queries the transaction ledger 520 using the transaction identifier to identify the source account. The intermediate payment processor 130 then initiates the new transfer from the intermediate account 530 to the source account 410A. In this manner, the online system 140 and intermediate payment processor 130 can reverse the transaction without exposing the source account 410A identifier to the online system 140.

The intermediate payment processor 130 conducts 650 the new transaction from the intermediate account 530 to the source account 410A. Upon completion, the secondary server 150 and/or intermediate payment processor 130 sends a confirmation to the online system 140 that the new transaction was completed, effectively reversing the initial transaction. The online system 140 and/or source device 110A may send a notification to the destination device 110B that the transaction will not proceed.

If the source device 110A did not send the instruction to reverse the transaction, but instead confirmed 660 completion of the transaction, e.g., upon receipt of the good or service, the process proceeds differently thenceforth. The online system 140 initiates 665 a transaction from the intermediate account 530 to the destination account 410B responsive to different triggers, depending upon the embodiment. One case, as mentioned, is if the online system 140 receives confirmation 660 of completion of the transaction, the online system 140 initiates 665 the transaction from the intermediate account 530 to the destination account 410B. Alternatively, if the online system 140 determines that at least a threshold amount of time has passed since the transaction from the source account 410A to the intermediate account 530, the online system 140 automatically initiates the transaction from the intermediate account 530 to the destination account 410B. For example, if three days have passed since the transaction to the intermediate account 530, the online system 140 initiates the transaction to the destination account 410B. As another alternative, if the online system 140 determines that the user profile of the seller is a high trust organization or associated with a high trust organization, the online system 140 does not delay initiation of the transfer from the intermediate account 530 to the destination account 410B after the transaction from the source account 410A to the intermediate account 530.

FIG. 7 is a flowchart illustrating a process for delayed transactions, in accordance with an embodiment. An online system 140 receives 710, from a first application 310 running on a source computing device 110A, information about a first transaction. The information about the first transaction includes a destination account 410B identifier and a payment amount, where the destination account 410B identifier identifies a destination account 410B to which a payment quantified by the payment amount is to be sent. The online system 140 sends 720, to the source computing device 110A, a deep link to a second application 320 on the source computing device 110A, the deep link comprising the information about the first transaction. The online system 140 receives 730, from the second application 320, a confirmation that the first transaction occurred, including a transaction identifier for the first transaction. The payment was sent to an intermediate account 530 at an intermediate payment processor 130, and the intermediate payment processor 130 records the first transaction in a ledger 520 in association with the transaction identifier and a source account 410A identifier identifying a source account 410A from which the payment was made. The online system 140 receives 740 an instruction to reverse the first transaction. The online system 140 sends 750, to the intermediate payment processor 130, an instruction to generate a second transaction from the intermediate account 530 to the source account 410A. The instruction to generate the second transaction includes the transaction identifier of the first transaction without the source account 410A identifier. The online system 140 receives 760 a confirmation of the second transaction, wherein the intermediate payment processor 130 queries the ledger 520 using the transaction identifier of the first transaction to identify the source account 410A identifier to which the second transaction directs the payment.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method, comprising:
receiving, by an online system, from a first application running on a source computing device, information about a first transaction comprising a destination account identifier and a payment amount, wherein the destination account identifier identifies a destination account to which a payment quantified by the payment amount is to be sent;
sending, by the online system, to the source computing device, a deep link to a second application on the source computing device, the deep link comprising the information about the first transaction;
receiving, by the online system, from the second application, a confirmation that the first transaction occurred comprising a transaction identifier for the first transaction, wherein the payment was sent to an intermediate account at an intermediate payment processor, and the intermediate payment processor records the first transaction in a ledger in association with the transaction identifier and a source account identifier identifying a source account from which the payment was made;

receiving, by the online system, an instruction to reverse the first transaction;

sending, by the online system, to the intermediate payment processor, an instruction to generate a second transaction from the intermediate account to the source account, wherein the instruction to generate the second transaction comprises the transaction identifier of the first transaction without the source account identifier; and receiving, by the online system from the intermediate payment processor, a confirmation of the second transaction, wherein the intermediate payment processor queries the ledger using the transaction identifier of the first transaction to identify the source account identifier to which the second transaction directs the payment.

2. The method of claim 1, further comprising:
sending, by the online system to a destination computing device associated with the destination account, a notification that the first transaction is reversed.

3. The method of claim 1, wherein the instruction to reverse the first transaction is received from the source computing device.

4. The method of claim 1, wherein the instruction to reverse the first transaction is received from a destination computing device associated with the destination account.

5. The method of claim 1, further comprising:
receiving, by the online system, from a new source computing device, information about a new transaction comprising a new destination account identifier that identifies a new destination account and a new payment amount;

sending, by the online system, to the new source computing device, a new deep link to the second application on the new source computing device, the deep link comprising the information about the new transaction;

receiving, by the online system, a confirmation that the new transaction occurred, wherein the new payment was sent to a new intermediate account; and sending, by the online system, an instruction to the intermediate payment processor to send the new payment from the new intermediate account to the new destination account.

6. The method of claim 5, wherein sending, by the online system, the instruction to the intermediate payment processor to send the new payment from the new intermediate account to the new destination account, is responsive to determining that a threshold amount of time has passed since the information about the new transaction was received.

7. The method of claim 5, wherein sending, by the online system, the instruction to the intermediate payment processor to send the new payment from the new intermediate account to the new destination account, is responsive to identifying the destination account as a trusted destination account.

8. A computer program product comprising a non-transitory computer-readable storage medium containing computer program code that, when executed by a computer processor of an online system, causes the computer processor of the online system to perform operations comprising:
receiving, from a first application running on a source computing device, information about a first transaction comprising a destination account identifier and a payment amount, wherein the destination account identifier identifies a destination account to which a payment quantified by the payment amount is to be sent;

sending, to the source computing device, a deep link to a second application on the source computing device, the deep link comprising the information about the first transaction;

receiving, from the second application, a confirmation that the first transaction occurred comprising a transaction identifier for the first transaction, wherein the payment was sent to an intermediate account at an intermediate payment processor, and the intermediate payment processor records the first transaction in a ledger in association with the transaction identifier and a source account identifier identifying a source account from which the payment was made;

receiving, an instruction to reverse the first transaction;

sending, to the intermediate payment processor, an instruction to generate a second transaction from the intermediate account to the source account, wherein the instruction to generate the second transaction comprises the transaction identifier of the first transaction without the source account identifier; and receiving, from the intermediate payment processor, a confirmation of the second transaction, wherein the intermediate payment processor queries the ledger using the transaction identifier of the first transaction to identify the source account identifier to which the second transaction directs the payment.

9. The computer program product of claim 8, the non-transitory computer-readable storage medium containing computer program code that, when executed by the computer processor of the online system, causes the computer processor of the online system to further perform operations comprising:
sending, to a destination computing device associated with the destination account, a notification that the first transaction is reversed.

10. The computer program product of claim 8, wherein the instruction to reverse the first transaction is received from the source computing device.

11. The computer program product of claim 8, wherein the instruction to reverse the first transaction is received from a destination computing device associated with the destination account.

12. The computer program product of claim 8, the non-transitory computer-readable storage medium containing computer program code that, when executed by the computer processor of the online system, causes the computer processor of the online system to further perform operations comprising:
receiving, by the online system, from a new source computing device, information about a new transaction comprising a new destination account identifier that identifies a new destination account and a new payment amount;

sending, by the online system, to the new source computing device, a new deep link to the second application on the new source computing device, the deep link comprising the information about the new transaction;

receiving, by the online system, a confirmation that the new transaction occurred, wherein the new payment was sent to a new intermediate account; and sending, by the online system, an instruction to the intermediate payment processor to send the new payment from the new intermediate account to the new destination account.

13. The computer program product of claim 12, wherein sending the instruction to the intermediate payment processor to send the new payment from the new intermediate account to the new destination account, is responsive to determining that a threshold amount of time has passed since the information about the new transaction was received.

14. The computer program product of claim 12, wherein sending the instruction to the intermediate payment processor to send the new payment from the new intermediate account to the new destination account, is responsive to identifying the destination account as a trusted destination account.

15. An online system, comprising:
a computer processor; and
a computer program product comprising a non-transitory computer-readable storage medium containing computer program code that, when executed by the computer processor of the online system, causes the computer processor of the online system to further perform operations comprising:
receiving, from a first application running on a source computing device, information about a first transaction comprising a destination account identifier and a payment amount, wherein the destination account identifier identifies a destination account to which a payment quantified by the payment amount is to be sent;
sending, to the source computing device, a deep link to a second application on the source computing device, the deep link comprising the information about the first transaction;
receiving, from the second application, a confirmation that the first transaction occurred comprising a transaction identifier for the first transaction, wherein the payment was sent to an intermediate account at an intermediate payment processor, and the intermediate payment processor records the first transaction in a ledger in association with the transaction identifier and a source account identifier identifying a source account from which the payment was made;
receiving, an instruction to reverse the first transaction;
sending, to the intermediate payment processor, an instruction to generate a second transaction from the intermediate account to the source account, wherein the instruction to generate the second transaction comprises the transaction identifier of the first transaction without the source account identifier; and
receiving, from the intermediate payment processor, a confirmation of the second transaction, wherein the intermediate payment processor queries the ledger using the transaction identifier of the first transaction to identify the source account identifier to which the second transaction directs the payment.

16. The online system of claim 15, the non-transitory computer-readable storage medium containing computer program code that, when executed by the computer processor of the online system, causes the computer processor of the online system to further perform operations comprising:
sending, to a destination computing device associated with the destination account, a notification that the first transaction is reversed.

17. The online system of claim 15, wherein the instruction to reverse the first transaction is received from a destination computing device associated with the destination account.

18. The online system of claim 15, the non-transitory computer-readable storage medium containing computer program code that, when executed by the computer processor of the online system, causes the computer processor of the online system to further perform operations comprising:
receiving, from a new source computing device, information about a new transaction comprising a new destination account identifier that identifies a new destination account and a new payment amount;
sending, to the new source computing device, a new deep link to the second application on the new source computing device, the deep link comprising the information about the new transaction;
receiving, a confirmation that the new transaction occurred, wherein the new payment was sent to a new intermediate account; and
sending, an instruction to the intermediate payment processor to send the new payment from the new intermediate account to the new destination account.

19. The online system of claim 18, wherein sending, the instruction to the intermediate payment processor to send the new payment from the new intermediate account to the new destination account, is responsive to determining that a threshold amount of time has passed since the information about the new transaction was received.

20. The online system of claim 18, wherein sending, the instruction to the intermediate payment processor to send the new payment from the new intermediate account to the new destination account, is responsive to identifying the destination account as a trusted destination account.

* * * * *